Dec. 4, 1923.

W. C. DURANT 1,475,941

VEHICLE FRAME AND SPRING SUSPENSION

Filed Oct. 25, 1919          2 Sheets-Sheet 1

Inventor
William C. Durant.
By Attorneys
Blackmore, Spencer & Flint.

Dec. 4, 1923.
W. C. DURANT
1,475,941
VEHICLE FRAME AND SPRING SUSPENSION
Filed Oct. 25, 1919    2 Sheets-Sheet 2
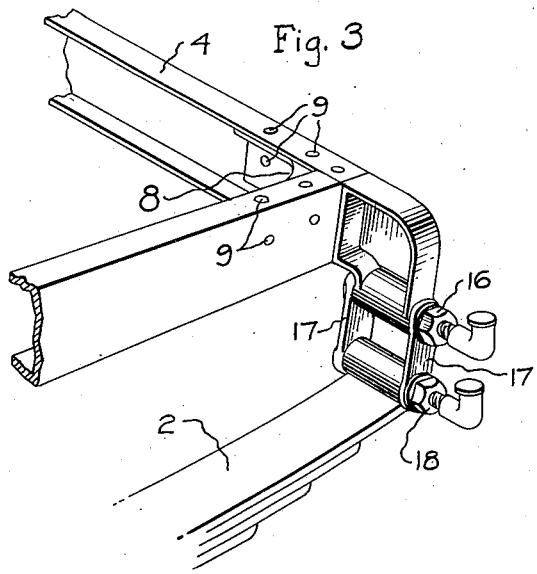
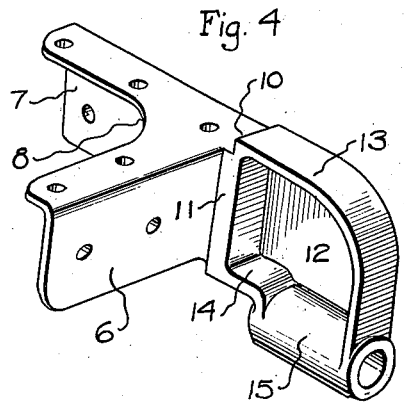
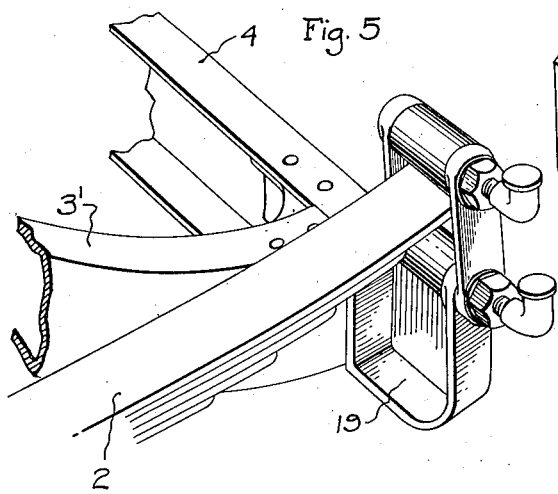
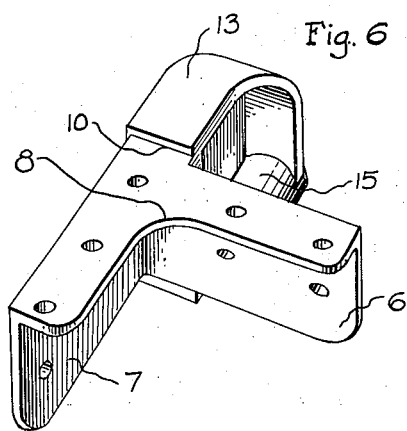
Inventor
William C. Durant
By Attorneys
Blackmore Spencer & Flint Patented Dec. 4, 1923.

1,475,941

UNITED STATES PATENT OFFICE.

WILLIAM C. DURANT, OF NEW YORK, N. Y., ASSIGNOR TO GENERAL MOTORS CORPORATION, OF DETROIT, MICHIGAN, A CORPORATION OF DELAWARE.

VEHICLE FRAME AND SPRING SUSPENSION.

Application filed October 25, 1919. Serial No. 333,195.

*To all whom it may concern:*

Be it known that I, WILLIAM C. DURANT, a citizen of the United States, and a resident of New York, county of New York, and State of New York, have invented certain new and useful Improvements in Vehicle Frames and Spring Suspensions, of which the following is a full, clear, concise, and exact description, such as will enable others skilled in the art to which the invention relates to make and use the same, reference being made therein to the accompanying drawings, which form a part of this specification.

It is customary in the manufacture of trucks and other vehicles to attach the rear end of the rear spring to the corresponding side bar at a point considerably forward of the end of the latter, the spring being disposed outside of the side bar: thus the load passes into the side bar under conditions such as set up severe twisting stresses in the frame. In accordance with the present invention, I eliminate these heavy twisting stresses from the side bars and preferably do away with the use of the gusset plates ordinarily employed to connect the rear cross bar to the side bars by utilizing the spring bracket itself as the element for rigidly connecting the cross bar to the side bar so that such portion of the load as would otherwise tend to twist the side bar is transferred directly to the end portion of the cross bar. The construction has the additional advantage of permitting more rapid assembly and is in general less expensive than existing ordinary practice.

In the drawing, Figure 1 is a fractional plan view showing one embodiment of the invention.

Figure 3 is a perspective view more clearly showing the relation of the bracket to the frame and spring, and—

Figure 4 is a similar view showing the bracket alone.

Figure 5 is a perspective view showing a modification.

Figure 6 is a perspective view showing the bracket as it would appear from the inner side of the frame.

Figure 2:
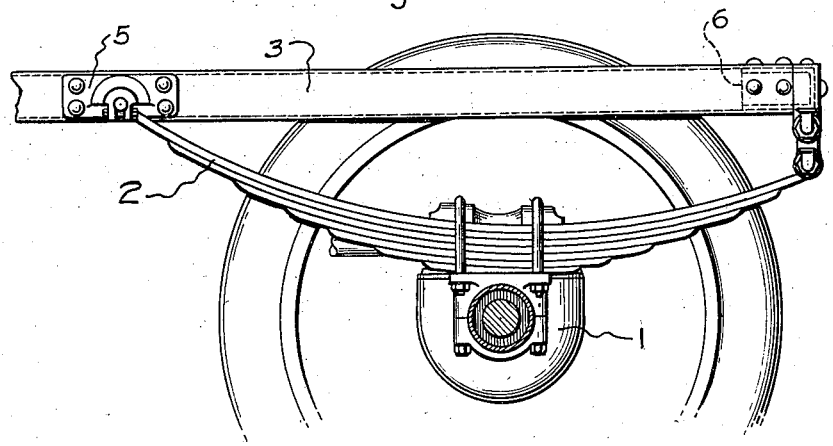
Figure 2 is a section on line 2—2 of Figure 1.
Figure 1:
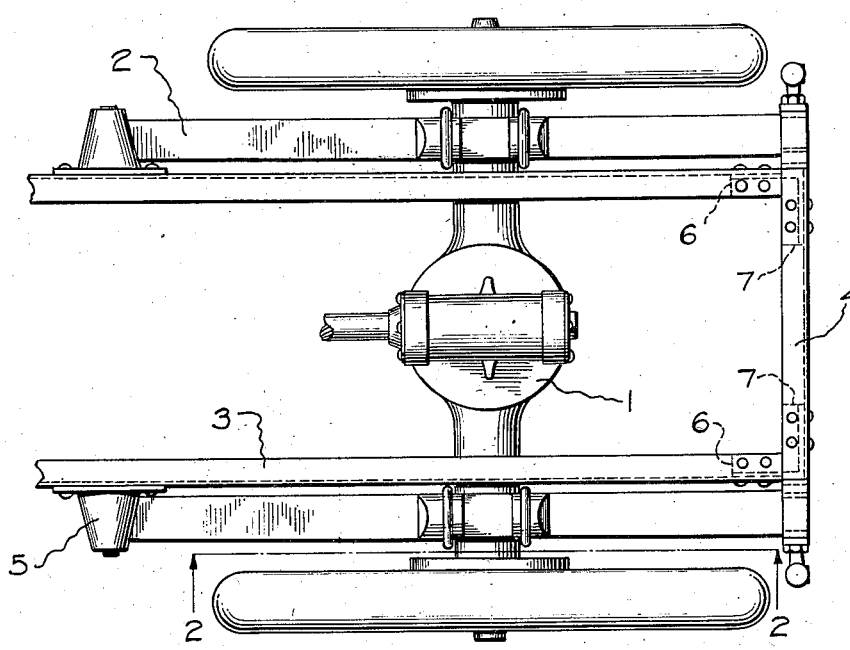

The rear axle construction 1 and springs 2 are of ordinary construction and the side bar 3 and rear cross-bar 4 are preferably of the usual channel sections. At the forward ends the connections between the springs and the side bars are made in any suitable way as by means of the brackets 5.

In accordance with the invention, the connection between the side bar and the cross bar and between these bars and the rear ends of the springs is made by means of brackets such as appears in Figure 4. As shown therein, these brackets, in their preferred construction, include the forwardly extending arms 6 and the transversely extending arms 7 both preferably of inverted L-shape in cross-section to provide flanges which extend along the webs and the lower surfaces of the frame bars. Preferably, the outer edges of the upper flanges of the arms lie for the most part within the channel of the corresponding frame bar, but they might extend further out into the space defined by the inner edges of the upper flanges of the frame bars than is shown at 8, in which event their resemblance to a gusset plate would be more apparent. Each bar of the frame is riveted to the upper flange and to the web of the corresponding arm of the bracket as indicated at 9. In the preferred construction, the rear cross bar extends to the outer planes of the side bars where its upper flange may abut or extend close up to a shoulder 10 formed on the bracket; in like manner, the rear end face of the web of the side bar preferably abuts a shoulder 11 on the bracket, and its upper flange may abut or come up flush with the front edge of the corresponding flange of the rear cross bar. Of course the actual construction may vary considerably from that described but the construction shown admirably serves the purpose. Outwardly from the arms 6 the bracket is continued downwardly preferably in the form of a web 12 and flanges 13—14 and terminates in a perforated boss 15 through which a shackle bolt 16 passes, the shackle bars 17 of the spring construction in turn being connected to the end of the spring by a bolt 18.

The construction shown in Fig. 5 differs from that just described merely in that the arm 19, which corresponds to the arm 12—13—14—15, extends upwardly rather than downwardly from the rest of the bracket—this in order to accommodate a frame wherein the rear end portion of the side bar 3' is bent or offset downwardly from the forward portion.

Various other changes in the actual details will naturally result in applying the invention to the different conditions encountered in practice, but I believe I am the first to connect the parts in the general manner indicated, and wish the claims to be interpreted accordingly. Again, while the construction is shown at the rear end of the frame only, it is obvious that in certain classes of vehicles, for example, trailers, the invention is applicable to the front end as well; and it is further evident that the shackles, or the equivalent, might be positioned at the end of the spring most remote from the bracket without departing from the spirit of the invention.

I claim:—

1. In a vehicle, a frame including a side bar and an end cross bar both of channel cross-section, a spring supporting the frame at one side, and a bracket riveted to said bars and having portions disposed in the channels thereof, and means extending from the bracket and forming a connection for the end portion of the spring.

2. A vehicle including a frame comprising a side bar having a channel on its inner side and an end bar, a bracket forming a corner piece rigidly joining said bars together and fitting into said channel inwardly from said end bar, a spring construction disposed on the outer side of the side bar, said bracket having an arm extending out beyond the outer side of the side bar, and connected to the spring construction, whereby twisting of the frame is reduced.

3. In a vehicle, a side bar and an end cross bar each having a channel in its inner side, a connecting member disposed in said channels and rigidly connecting said bars together, said connecting member projecting beyond the outer side of the side bar, and a spring construction whereon the projecting portion of said member rests.

4. In a vehicle, a frame side bar, a frame end bar overlapping the side bar, a bracket attached to said bars on the inner sides thereof and projecting outwardly between the end of the side bar and the end bar, and a spring construction whereon the outwardly projecting portion of the bracket rests.

5. A vehicle frame construction including a side bar and an end cross-bar one of which is arranged to overlap the other, a bracket attached to said bars and extending along the inner sides thereof, said bracket projecting through between the end portions of said bars, and a spring construction whereon that portion of the bracket which so projects rests.

In testimony whereof I affix my signature.

WILLIAM C. DURANT.